(12) United States Patent
Barriault et al.

(10) Patent No.: US 7,086,441 B2
(45) Date of Patent: Aug. 8, 2006

(54) HYDRAULIC GOVERNOR DEVICE FOR USE WITH A ROTATIONAL SHAFT, AND DOOR ASSEMBLY INCLUDING THE SAME

(75) Inventors: Patrick Barriault, Caplan (CA); François Beaudoin, Drummondville (CA); Danny Roy, Drummondville (CA)

(73) Assignee: Canimex Inc., Quebec (CA)

( * ) Notice: Subject to any disclaimer, the term of this patent is extended or adjusted under 35 U.S.C. 154(b) by 284 days.

(21) Appl. No.: 10/682,162

(22) Filed: Oct. 9, 2003

(65) Prior Publication Data
US 2004/0124050 A1    Jul. 1, 2004

(30) Foreign Application Priority Data
Oct. 10, 2002    (CA)    ................................... 2407464

(51) Int. Cl.
*E05F 15/20*    (2006.01)
(52) U.S. Cl. .............................. 160/8; 160/296; 49/322
(58) Field of Classification Search ................ 160/8, 160/296, 310, 188, 189; 49/322; 74/573.1, 74/573.13; 188/322.5, 293; 192/58.4, 58.41, 192/58.42, 58.43
See application file for complete search history.

(56) References Cited

U.S. PATENT DOCUMENTS

| | | | | |
|---|---|---|---|---|
| 3,373,633 A | * | 3/1968 | Desmond et al. | ........ 74/573.13 |
| 4,432,254 A | * | 2/1984 | Schultz | ...................... 74/573.1 |
| 5,022,452 A | * | 6/1991 | Burrell | ........................... 160/7 |
| 5,421,221 A | * | 6/1995 | Warchocki | ................... 160/310 |
| 5,634,507 A | * | 6/1997 | Kwoka | ......................... 160/310 |
| 5,881,849 A | * | 3/1999 | Gassmann | ................... 188/294 |
| 6,059,008 A | * | 5/2000 | Yoshida et al. | ............. 160/296 |
| 6,123,134 A | * | 9/2000 | Thomas et al. | ................. 160/8 |
| 6,155,328 A | * | 12/2000 | Welfonder | .................... 160/313 |
| 6,698,558 B1 | | 3/2004 | Caraballo | ................ 188/266.1 |

* cited by examiner

*Primary Examiner*—David Purol
(74) *Attorney, Agent, or Firm*—Merchant & Gould P.C.

(57) ABSTRACT

A hydraulic governor device for use with a rotational shaft of a door assembly for controlling a rotation of said rotational shaft. The device includes a sleeve; first and second end coverings mounted respectively onto first and second ends of the sleeve so as to define an hydraulic flow path; a fluid substantially filling the hydraulic flow path; an input shaft extending through the ends coverings and the chamber, and being operatively connected to the rotational shaft of the door assembly; first and second pistons disks positioned inside the chamber and mounted about the input shaft, the pistons disks being connected to each other and being slidably movable along the input shaft; and a reciprocating assembly operatively connected between the input shaft and the piston disks and cooperating with the same for converting a rotation of the input shaft into a reciprocating movement of the pistons disks within a chamber, so that said reciprocating movement of the pistons disks inside the chamber causes in turn the fluid to travel along a reciprocating movement along the hydraulic flow path, said reciprocating movement of the fluid along the hydraulic flow path causing a damping effect of the rotation of the input shaft and thus controlling the rotation of the rotational shaft of the door assembly via a damping effect.

20 Claims, 5 Drawing Sheets

HYDRAULIC GOVERNOR DEVICE FOR USE WITH A ROTATIONAL SHAFT, AND DOOR ASSEMBLY INCLUDING THE SAME

FIELD OF THE INVENTION

The present invention relates to a governor device. More particularly, the present invention relates to a hydraulic governor device for use with a rotational shaft, such as the overhead shaft of garage doors, mini-warehouse doors, commercial rolling steel doors and the like, for instance, the device being used to controllably govern the rotation of the shaft operatively actuated by a torque resulting from a given force. For example, the device may be used to controllably govern the rotation of an overhead shaft of a garage door operatively connected to a driving mechanism or a counterbalancing mechanism in the event of a failure and/or undesirable effect of said mechanism so as to prevent the garage door from falling uncontrollably to the ground due to the weight of the door or move up uncontrollably due to an excessive upward counterbalancing force.

BACKGROUND OF THE INVENTION

It is known in the art that several engineering problems are related in one way or another to the simple requirement of governing or slowing a weight of any kind. These problems occur when there is a need to control the speed of the weight which is deprived of a driving (or "counterbalancing") mechanism. Generally, such a situation occurs when the driving mechanism is not designed to control the speed in both directions or when there is an emergency situation or failure of the mechanism. Sometimes, driving mechanisms are not totally fail safe by design.

It is also known in the art that a fail safe mechanism or device is going to react in such a manner that, in a case of emergency or internal failure, the weight is going to move to a safe position at a controlled rate. Several mechanisms or devices are actually devised to brake and/or stop the weight they are meant to move, at the last known position before failure of the mechanism. Very often, such a behavior is not acceptable for many devices and mechanisms because a weight several feet above ground is still subject to fall if the link of the device or mechanism fails, and, if it is the case, there is nothing to stop or control the falling of the weight.

U.S. Pat. No. 4,432,254 granted to SCHULTZ on Feb. 21$^{st}$, 1984, relates to a viscous damper having rigid plastic structure. This viscous damper which has any one or more of three main features, namely at least one of a rotor and housing being formed from rigid plastic material, a bearing projection on one housing portion extending from the plane of the housing working surface less than shear film spaced relation toward the working surface of the rotor member, and means for closing a filler opening through the housing comprising a sealing disk engaging on a shoulder across the opening and a retainer pressing the disk onto the shoulder and having radial retaining teeth, retainingly engaging a wall about the opening.

A problem associated with this type of viscous damper is the fact that it is not adjustable in real-time and it is not autonomous or disc-brake controlled by an electronic device with a feedback system to produce a governor-like behavior. Furthermore, another problem associated with this type of viscous damper is the fact that it requires an external source of power and is more complex than other governor devices.

Also known in the art are the following U.S. patents and patent applications which describe various devices for use with rotational shafts: U.S. Pat. Nos. 5,022,452 (Burrell); U.S. Pat. No. 5,421,221 (Warchocki); U.S. Pat. No. 5,634,507 (Kwoka); U.S. Pat. No. 6,059,008 (Yoshida et al.); U.S. Pat. No. 6,123,134 (Thomas et al.); U.S. Pat. No. 6,129,131 (Colson); U.S. Pat. No. 6,155,328 (Welfonder); U.S. Pat. No. 6,223,802 B1 (Colson); U.S. Pat. No. 6,443,210 B1 (Welfonder); 2002/0179258 A1 (Welfonder); and 2003/0024658 A1 (Beaudoin et al.).

Also known in the art are the many problems associated with these types of devices, which are related to the design of any governing mechanism, that is intended to be totally fail safe, examples of which are the following: the limited space available to implement the governing device; the need of feedback mechanisms to adjust the speed rate; the constant torque given by the braking device; the lack of mechanism that gives high torque in function of the speed rate; the lack of easy and real-time adjustment in the governing device; and the relative high cost of such devices. Hence, a big challenge essentially lies is resolving these different aspects with a single integrated system.

Hence, in light of the aforementioned, there is a need for an improved governor device which would be able to overcome some of the aforementioned problems.

SUMMARY OF THE INVENTION

The object of the present invention is to provide a governor device which, by virtue of its design and components, satisfies some of the above-mentioned needs and which is thus an improvement over other governor devices known in the prior art.

In accordance with the present invention, the above object is achieved with a hydraulic governor device for use with a rotational shaft of a door assembly for controlling a rotation of said rotational shaft, the device comprising:

a sleeve having first and second opposite ends, the sleeve comprising a chamber, and a tube being separate from said chamber;

first and second end coverings each being provided with a recess shaped and sized to cooperate with the tube and the chamber, the first and second end coverings being mounted respectively onto the first and second ends of the sleeve so as to define a hydraulic flow path from one end of the chamber to another end of the chamber, said hydraulic flow path extending through the recess of the first end covering, the tube, and the recess of the second end covering;

a fluid substantially filling the hydraulic flow path and being able to travel along said path;

an input shaft extending through the ends coverings and the chamber, the input shaft being operatively connected to the rotational shaft of the door assembly so as to rotate with the same;

a first piston disk positioned inside the chamber and mounted about the input shaft, the first piston disk being slidably movable along the input shaft;

a second piston disk positioned inside the chamber and mounted about the input shaft, the second piston disk being slidably movable along the input shaft and being further connected to the first piston disk with spacer rods so as to slide in accordance with the first piston disk along the input shaft; and a reciprocating assembly operatively connected between the input shaft and the piston disks and cooperating with the same for converting a rotation of the input shaft into a reciprocating movement of the pistons disks within the chamber, so that said reciprocating movement of the pistons disks inside the chamber causes in turn the fluid to travel along a reciprocating movement along the hydraulic flow path, said reciprocating movement of the fluid along the hydraulic flow path causing a damping effect of the rotation of the input shaft and thus controlling the rotation of the rotational shaft of the door assembly via a damping effect.

According to another aspect of the invention, there is also provided a door assembly having a door curtain operable via a rotation of a rotational shaft, the door assembly comprising a hydraulic governor device cooperating with the rotational shaft for controlling a rotation of said shaft, the device comprising:

a sleeve having first and second opposite ends, the sleeve comprising a chamber, and a tube being separate from said chamber;

first and second end coverings each being provided with a recess shaped and sized to cooperate with the tube and the chamber, the first and second end coverings being mounted respectively onto the first and second ends of the sleeve so as to define a hydraulic flow path from one end of the chamber to another end of the chamber, said hydraulic flow path extending through the recess of the first end covering, the tube, and the recess of the second end covering;

a fluid substantially filling the hydraulic flow path and being able to travel along said path;

an input shaft extending through the ends coverings and the chamber, the input shaft being operatively connected to the rotational shaft of the door assembly so as to rotate with the same;

a first piston disk positioned inside the chamber and mounted about the input shaft, the first piston disk being slidably movable along the input shaft;

a second piston disk positioned inside the chamber and mounted about the input shaft, the second piston disk being slidably movable along the input shaft and being further connected to the first piston disk with spacer rods so as to slide in accordance with the first piston disk along the input shaft; and a reciprocating assembly operatively connected between the input shaft and the piston disks and cooperating with the same for converting a rotation of the input shaft into a reciprocating movement of the pistons disks within the chamber, so that said reciprocating movement of the pistons disks inside the chamber causes in turn the fluid to travel along a reciprocating movement along the hydraulic flow path, said reciprocating movement of the fluid along the hydraulic flow path causing a damping effect of the rotation of the input shaft and thus controlling the rotation of the rotational shaft of the door assembly via a damping effect.

The objects, advantages and other features of the present invention will become more apparent upon reading of the following non-restrictive description of a preferred embodiment thereof, given for the purpose of exemplification only with reference to the accompanying drawings.

BRIEF DESCRIPTION OF THE DRAWINGS

FIG. 6 is a schematic diagram of the governor device according to the present invention.

DETAILED DESCRIPTION OF A PREFERRED EMBODIMENT OF THE INVENTION

Figure 1:
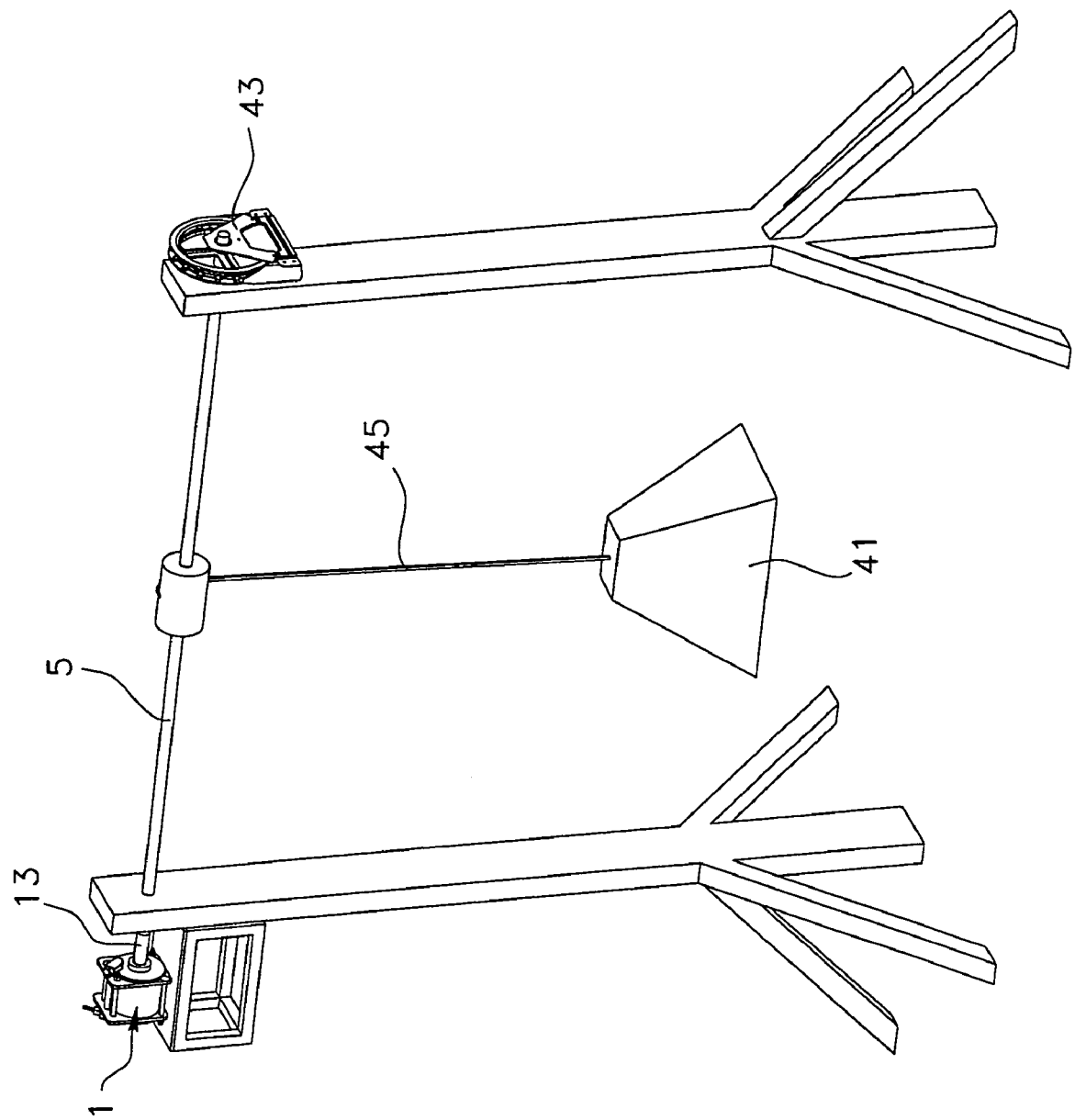
FIG. 1 is a perspective view of a rotational shaft operatively connected to a driving mechanism, the rotational shaft being provided with a governor device according to a preferred embodiment of the present invention.

In the following description, the same numerical references refer to similar elements. The embodiments shown in the figures are preferred.

Moreover, although the present invention was primarily designed for use with rotational shafts (or "overhead shafts") of garage door assemblies and the like, it may be used with other rotational shafts and in other fields, as apparent to a person skilled in the art. For this reason, expressions such as "garage", "overhead", "shaft", etc., used herein should not be taken as to limit the scope of the present invention and includes all other kinds of doors or items with which the present invention could be used and may be useful. As will also be easily understood, the cross-sectional area of the shaft according to the present invention is not necessarily limited to a circular configuration, and may take on other suitable geometrical configurations, such a square, rectangular, triangular, etc., as also apparent to a person skilled in the art.

Moreover, in the context of the present invention, the expressions "overhead shaft", "rotational shaft", and any other equivalent expression known in the art will be used interchangeably. Furthermore, the same applies for any other mutually equivalent expressions, such as "damper" and "governor", "driving" and "counterbalancing", as well as "fluid", "liquid" and "hydraulic" for example, as also apparent to a person skilled in the art.

In addition, although the preferred embodiment of the present invention as illustrated in the accompanying drawings comprises various components (cams, protruding elements, posts, valves, etc.) and although the preferred embodiment of the governor device 1 as shown consists of certain geometrical configurations as explained and illustrated herein, not all of these components and geometries are essential to the invention and thus should not be taken in their restrictive sense, i.e. should not be taken as to limit the scope of the present invention. It is to be understood, as also apparent to a person skilled in the art, that other suitable components and cooperations thereinbetween, as well as other suitable geometrical configurations may be used for the governor device 1 and the corresponding parts thereof according to the present invention, as briefly explained herein, without departing from the scope of the invention.

Broadly described, the present invention, as shown in the accompanying drawings, relates to a hydraulic governor device 1 for use with a rotational shaft 5, such as the overhead shaft 5 of a garage door assembly for example, for controlling a rotation of said rotational shaft 5, particularly in the event of a failure (or undesirable effect) of the driving and/or counterbalancing mechanism of the garage door assembly. The device comprises a sleeve 7; first and second end coverings 9; a fluid 11; an input shaft 13; first and second piston disks 15; and a reciprocating assembly.

Figure 2:
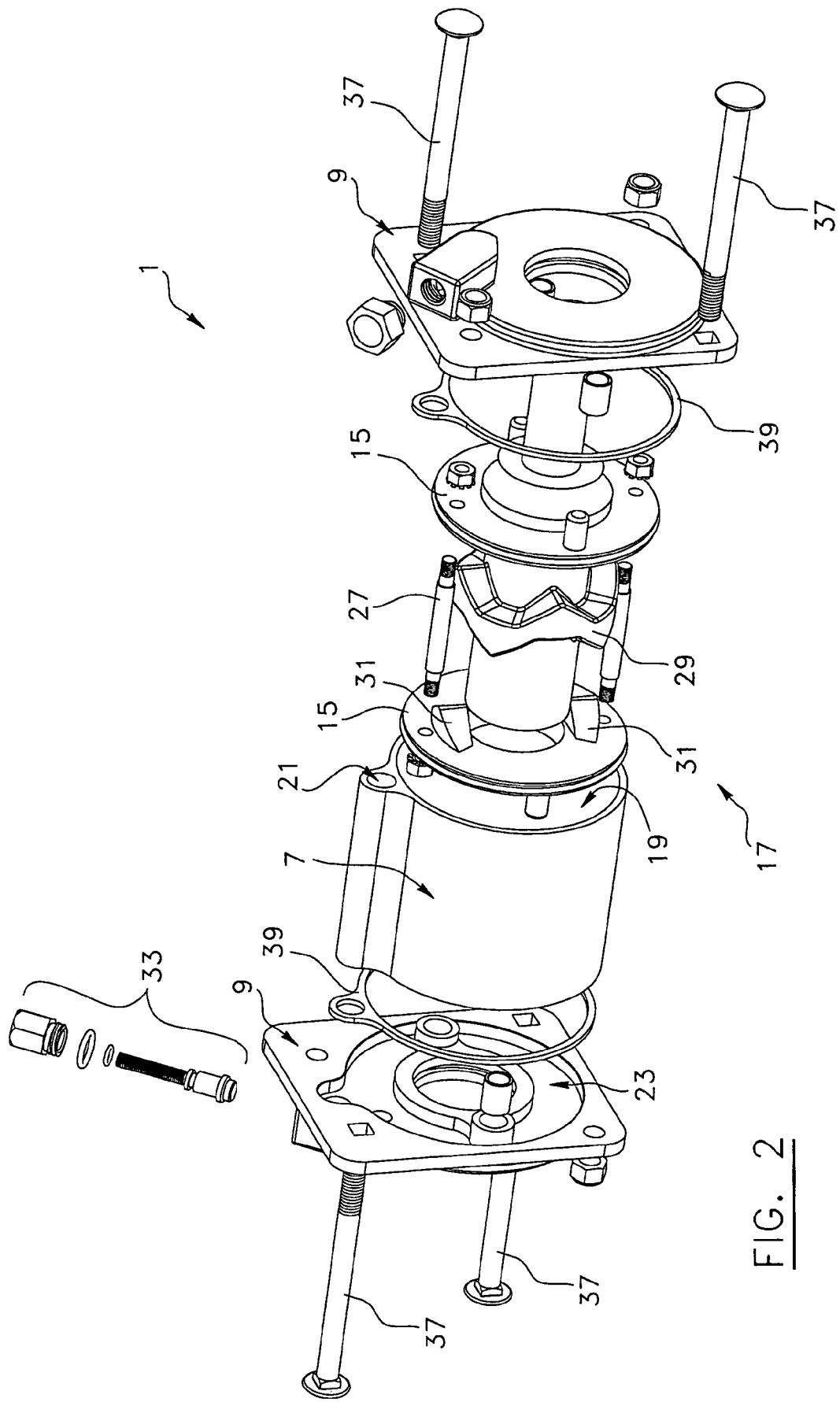
FIG. 2 is an exploded view of the components of the governor device shown in FIG. 1.

As better shown in FIG. 2, the sleeve 7 of the device 1 preferably has first and second opposite ends, and comprises a chamber 19, as well as a tube 21 being separate from the chamber. As also better shown in this figure, the first and second end coverings 9 are each provided with a corresponding recess 23 shaped and sized to cooperate with the tube 21 and the chamber 19, the first and second end coverings 9 being mounted respectively onto the first and second ends of the sleeve 7 so as to define a hydraulic flow path 25 from one end of the chamber 19 to another end of the chamber 19, said hydraulic flow path 25 extending through the recess 23 of the first end covering 9, the tube 21, and the recess 23 of the second end covering 9, as better shown in FIG. 3. It is worth mentioning that the hydraulic flow path 25 is not fixed in space per se, and may vary depending on the positioning of the piston disks 15, as will be explained in greater detail hereinbelow.

Preferably, the fluid 11 substantially fills the above-mentioned hydraulic flow path 25 and is able to travel along said path in a reciprocating movement, as will also be explained in greater detail hereinbelow. Preferably also, the fluid 11 is a substantially incompressible fluid 11.

As better shown in FIGS. 2 to 5, the input shaft 13 of the device 1 preferably extends through the end coverings 9 and the chamber 19, and is operatively connected to the rotational shaft 5 of the door assembly so as to rotate with the same. That is, the input shaft 13 rotates (accelerates/decelerates) in response to a rotation of the rotational shaft 5, and vice versa, the rotational shaft 5 rotates (accelerates/decelerates) in accordance with the rotation of the input shaft 13.

Figure 3:
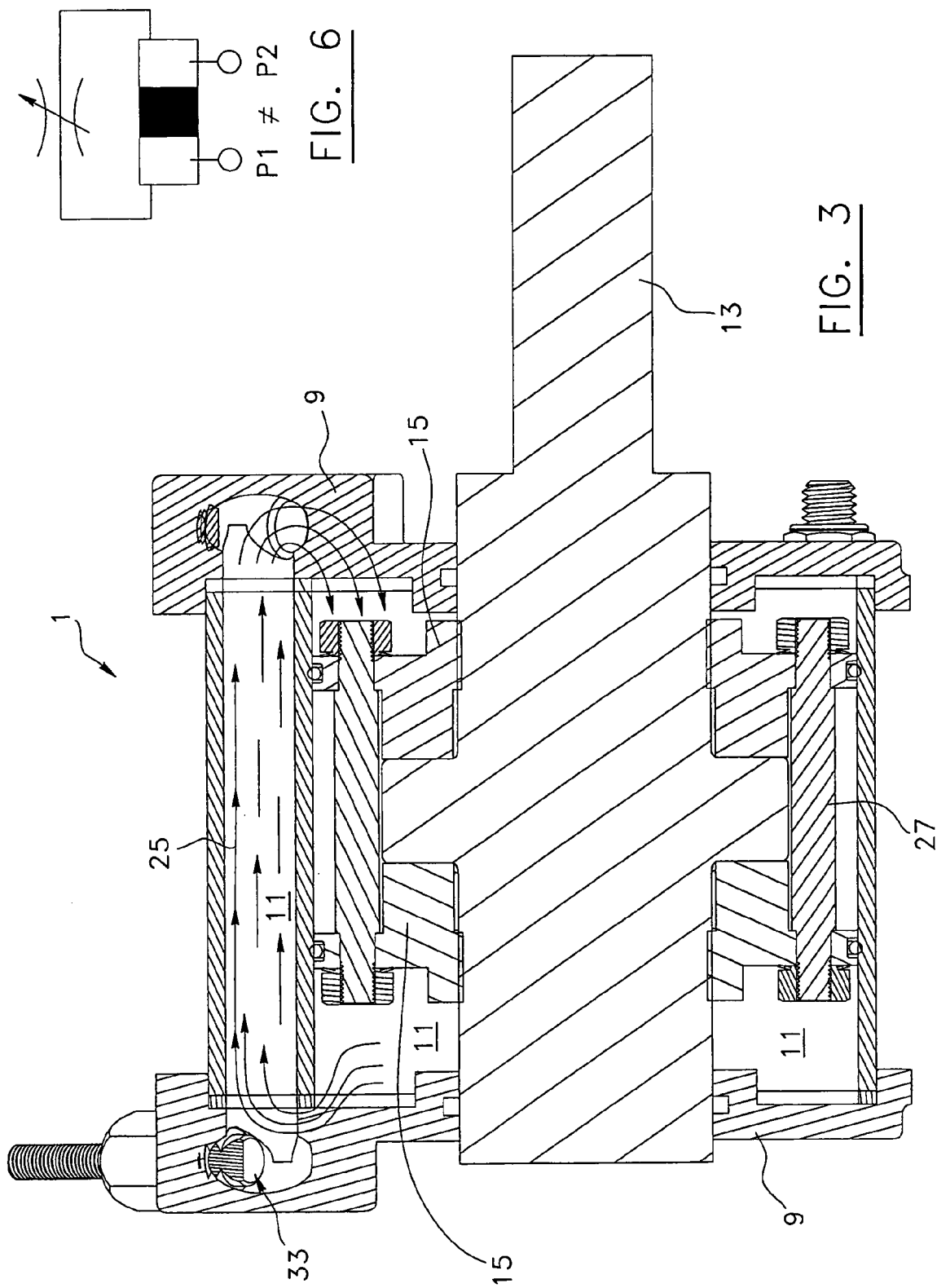
FIG. 3 is a cross-sectional of the governor device shown in FIG. 1.
Figure 4:
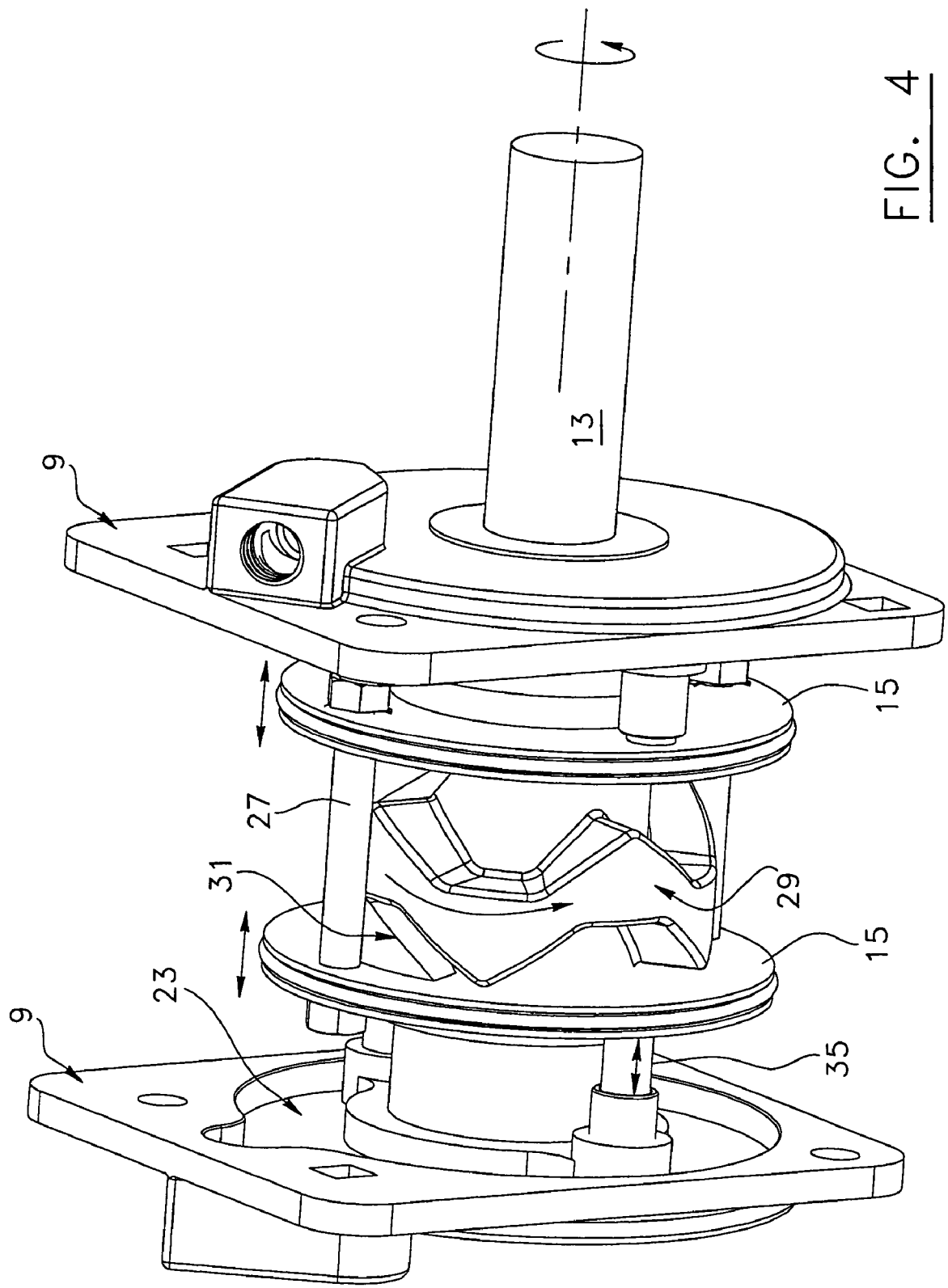
FIG. 4 is a perspective view of some of the components of the governor device of FIG. 2, these components being shown in an assembled configuration.
Figure 5:
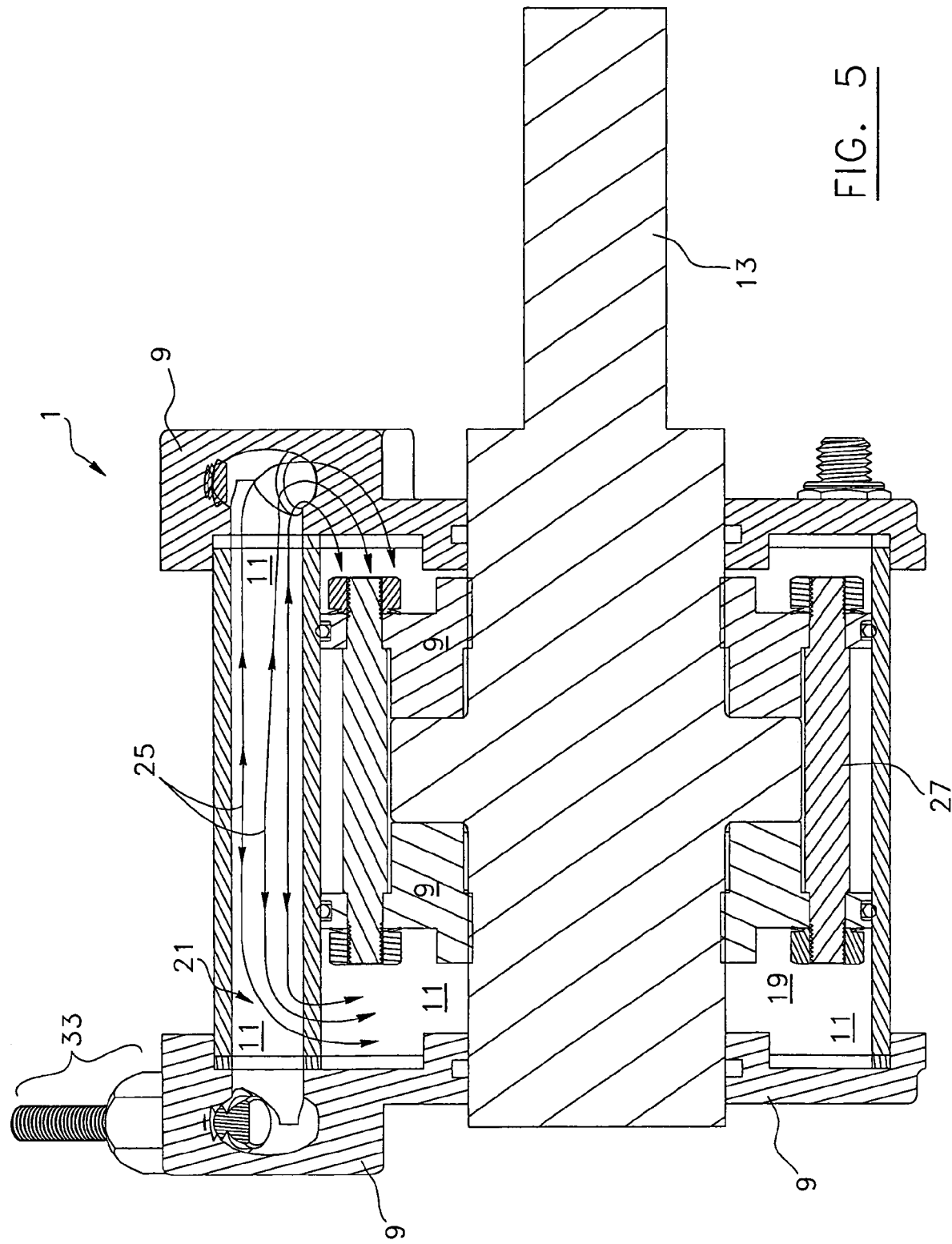
FIG. 5 is another cross-sectional view of the governor device shown in FIG. 1.

Preferably also, the first piston disk 15 is positioned inside the chamber 19 and mounted about the input shaft 13, and is devised to be slidably moveable along the input shaft 13, as can be easily understood when referring to FIGS. 3–5. Similarly, the device comprises a second piston disk 15 positioned inside the chamber 19 and mounted about the input shaft 13, the second piston disk 15 being slidably moveable along the input shaft 13 and being further connected to the first piston disk 15 with spacer rods 27, as better shown in FIG. 2, so as to slide in accordance with the first piston disk 15 along the input shaft 13, as can also be easily understood when referring to FIGS. 2–5.

According to the present invention, the hydraulic governor device 1 comprises a reciprocating assembly 17 being operatively connected between the input shaft 13 and the piston disks 15, and cooperating with the same, i.e. said input shaft 13 and said piston disks 15, for converting a rotation of the input shaft 13, being preferably securely connected to the rotational shaft 5 of the door assembly, as aforementioned, into a reciprocating movement of the piston disks 15 within the chamber 19, so that said reciprocating movement of the piston disks 15 inside the chamber 19 causes in turn the fluid 11 to travel along a reciprocating movement (i.e. back and forth movement) along the hydraulic flow path 25, said reciprocating movement of the fluid 11 along the hydraulic flow path 25 causing a damping effect of the rotation of the input shaft 13 and thus controlling the rotation of the rotational shaft 5 of the door assembly via a damping effect, in the event of a failure (or undesirable effect) of the driving and/or counterbalancing mechanism of the door assembly, so as to prevent the garage door from falling uncontrollably to the ground due to the weight of the door or move up uncontrollably due to an excessive upward counterbalancing force for example.

As better shown in FIGS. 2 and 4, the reciprocating assembly preferably comprises a plurality of cams 29 securely mounted about the input shaft 13, between the first and second piston disks 15. The reciprocating assembly also preferably comprises a first element 31 protruding from the first piston disk 15, and a second element 31 protruding from the second piston disk 15.

As can be easily understood when referring more particularly to FIG. 4, the first element 31 cooperates with the cams 29 via a rotation of the input shaft 13 for urging the first piston disk 15 away from the cams 29 and similarly, the second element 31 cooperates with the cams 29 via a rotation of the input shaft 13 for urging the second piston disk 15 away from the cams 29, thereby causing the first and second piston disks 15 to undergo a reciprocating movement inside the chamber 19 as the input shaft 13 rotates as a result of the rotational shaft 5 of the door assembly rotating. Preferably also, two protruding elements 31 are provided on the first piston disk 15, as better shown in FIG. 2, and two other similar protruding elements 31 are preferably provided on the second piston disk 15. It is worth mentioning that according to the present invention, other types of suitable reciprocating assemblies 17 may be used so as to convert a rotation from the input shaft 13 into a reciprocating movement of the first and second piston disks 15, as apparent to a person skilled in the art.

According to the preferred embodiment of the present invention, at least one of the end coverings 9 is provided with a flow control valve 33 operatively connected to the hydraulic flow path 25 for controlling flowing conditions of the fluid 11 inside the hydraulic flow path 25, i.e. control the frequency of reciprocating movements of the fluid 11, and thus control rate of the rotation of the rotational shaft 5 of the door assembly, as apparent to a person skilled in the art.

As better shown in FIGS. 2 and 4, the hydraulic governor device 1 preferably comprises a first guiding post 35 operatively connected between the first end covering 9 and the first piston disk 15 for guiding movements of the first piston disk 15 along the chamber 19, that is for preferably ensuring an axial movement of the first piston disk 15 along the chamber 19. Similarly, the device 1 comprises a second guiding post 35 operatively connected between the second end covering 9 and the second piston disk 15 for guiding movements of the second piston disk 15 along the chamber. As can be easily understood by a person skilled in the art, the guiding posts 35, let alone the second guiding post 35, are not absolutely necessary for proper operation of the hydraulic governor device 1, but are preferably introduced into the device 1 for preventing rotation of the disks 15 about the input shaft 13, which is advantageous, as is known by a person skilled in the art. Moreover, according to the preferred embodiment of the present invention, in order for the piston disks 15 to undergo a reciprocating movement inside the chamber 19, i.e. sliding back and forth onto the input shaft 13, these piston disks 15 are preferably provided with suitable bores through which extends the input shaft, and said bores are preferably provided with suitable bearings for facilitating sliding of the piston disks 15 along the input shaft 13, as apparent to a person skilled in the art.

Preferably also, the device 1 comprises suitable seals provided between the piston disks 15 and the chamber 19, and between the piston disks 15 and the input shaft 13, for substantially preventing fluid 11 from the hydraulic flow path 25 from entering into the chamber 19 between the first and second piston disks 15.

As can be easily understood when referring to FIG. 2, the first and second end coverings 9 are preferably mounted respectively onto the first and second ends of the sleeve 7 and fastened onto each other by means of tie rods 37. These four tie rods 37 are preferably bolted to the end coverings 9 with appropriate fasteners, such as nylon lock hexagonal nuts for example. It is worth mentioning that other suitable types of fasteners and materials may be used, as apparent to a person skilled in the art. Indeed, the device is preferably intended to be a suitably enclosed hydraulic device 1, in that, its construction is similar to that of a tie rod hydraulic cylinder used to imply translation with a pressurized fluid, as is known in the art.

Consequently, the device 1 preferably comprises a first seal 39 provided between the first end of the sleeve 7 and the first end covering 9, as well as a second seal 39 provided between the second end of the sleeve 7 and the second end covering 9, for substantially preventing fluid 11 from exiting the device 1, and thus ensuring that a suitable amount of fluid 11 is contained in the hydraulic flow path 25 for carrying out the damping effect, as apparent to a person skilled in the art.

Referring now back to FIG. 1, there is shown a general view of the governor device 1 solidly mounted to a fixed structure, i.e. one that has no free degrees of freedom. The device is operatively connected to a rotational shaft 5 that is controlling a vertical weight 41, which in the present case is used to schematically represent a door of a door assembly for example. A driving mechanism 43, such as chain hoist may be used to move the weight 41 upward and downward. If any problems occurs with the driving mechanism 43, excluding of course a failure or collapsing of the cable 45 holding the weight (door), then the weight is no more within the control of the chain hoist (driving mechanism 43). As aforementioned, a purpose of the governor device 1 according to the present invention is thus' to regulate the falling speed of the weight 41 until it reaches the floor level in the event of a failure of the driving mechanism 43, or counterbalancing mechanism 43 if provided, for that matter.

As previously discussed, FIGS. 2 to 5 refer to a detailed description of the mechanism of the governor device 1. The input shaft 13 of the device 1 is preferably connected in rotation with the rotational shaft 5. The input shaft 13 has preferably height cams 29 that are inside the sleeve 7 and the end coverings 9. These height cams 29 are preferably in interference with corresponding protruding elements 31 on the piston disks 15 in such a manner that with each turn of the input shaft 13, the piston disks 15 are doing a back and forth movement, preferably four times. This back and forth movement of the piston disks 15 is possible because their rotation is preferably blocked by two posts 35 on each of them that are preferably sliding into corresponding bushings in the end coverings 9. Hence, a function of the protruding elements 31 on the piston disks 15 and the input shaft 13 is to transform the rotation of the said input shaft 13 into translation for the piston disks 15, either axially, radially or perpendicular to the axle of the input shaft, as apparent to a person skilled in the art. According to the preferred embodiment of the present invention, as explained, the translation is preferably parallel (axially) to the axle of the input shaft 13. In order to avoid locking problems and to minimized the friction in rotation due to axial load, appropriate bearings are preferably provided in the end coverings 9, as apparent to a person skilled in the art. These bearings are preferably placed between the input shaft 13 and the end coverings 9 to prevent the movement of the said input shaft 13.

The movement of the piston disks 15 implies a movement of the fluid 11 of the device 1 from one side of a piston disk 15 to the other side of the other piston disk 15 through the hydraulic flow path 25. As can be easily understood, a restriction of the fluid 11 in the valve 33 limits the flow rate, thus increases the pressure inside the device 1 and limits the speed of the translation movement of the piston disks 15, and finally limits the rotational speed of the input shaft 13 (and thus, of the rotational shaft 5). In order to achieve this, the fluid 11 must be preferably incompressible, such as hydraulic oil for example. Combined with this first effect, the limitation of the rotation of the input shaft 13 is preferably increased with the increasing speed of the fluid 11 inside the device 1 by increasing the pressure in the flow path 25.

The adjustment of this device 1 in terms of rotational speed of the input shaft 13 is preferably obtained by turning the control valve 33 either clockwise or counter-clockwise. Preferably also, the adjustment range is fixed for a given embodiment and depends of the maximum flow rate and the minimum leakage between the piston disks 15.

The piston disks 15 are preferably linked together with two spacer rods 27 to maintain an equal volume of fluid 11 on each side of the piston disks 15. It is important to note that some leakage between the piston disks 15 is possible and permitted without affecting the device 1. However, an embodiment of this device 1 with high internal leakage is going to have a smaller range of adjustment, but is still going to be able to regulate the speed rate of the weight 41.

In the present embodiment, the raising of the weight 41 is also going to be regulated by the device 1 because there is nothing to disconnect or to deactivate it. According to the present invention, there may be means for connecting or disconnecting this device 1, whether manually or remotely, as is well known in the art.

In the present embodiment, the acceleration rate is that of the gravity of the earth. The device 1 is preferably not sensitive to acceleration rate and direction. This means that the device 1 could be used to regulate the speed of a rotational shaft 5 with an acceleration rate lower or higher than that of the gravity. Moreover, the direction of the acceleration of the weight 41 does not affect the operation of the device 1. The way the device 1 is linked to the weight 41 determines its effect on the weight 41. Hence, changing the acceleration rate or its direction will not affect the operation of the device 1, as apparent to a person skilled in the art.

In the present embodiment, the movement of the weight 41 is vertical, from the top to the bottom and the device 1 is designed to work with a rotational shaft 5. This means that if the door is sliding horizontally with a given speed, this invention is going to regulate its speed and stop it at a given position.

As may now be appreciated, the present invention is a substantial improvement over the prior art in that by virtue of its design and components, the governor device 1 according to the present invention is a compact governor mechanism in a low cost form factor. The device 1 delivers a high torque with a small volume and dimensions without the need of any device reading or compiling the speed rate (feedback system) of the governed weight. In addition, the device 1 is totally independent of any external energy source, thus providing a totally autonomous governor. Also, the device 1 is easy to adjust in real-time and is a fail safe component of any security system according to the definition given above. Moreover, the device 1 can be used as a rolling fire door governor device for emergency speed controlled and quick test close-up system (with anti-backdrive)

The present invention is also advantageous in that it is directed to any assembly using a rotational shaft 5 to control its speed and/or position or the speed and/or position of its pay load. In particular, an assembly that is moving a weight 41 (i.e. door) through a rotational shaft 5 that could go backward and accelerate to a high speed if not governed properly.

Of course, numerous modifications could be made to the above-described embodiments without departing from the scope of the invention as defined in the appended claims.

What is claimed is:

1. A hydraulic governor device for use with a rotational shaft of a door assembly for controlling a rotation of said rotational shaft, the device comprising:
   a sleeve having first and second opposite ends, the sleeve comprising a chamber, and a tube being separate from said chamber;
   first and second end coverings each being provided with a recess shaped and sized to cooperate with the tube and the chamber, the first and second end coverings being mounted respectively onto the first and second ends of the sleeve so as to define a hydraulic flow path from one end of the chamber to another end of the chamber, said hydraulic flow path extending through the recess of the first end covering, the tube, and the recess of the second end covering;
   a fluid substantially filling the hydraulic flow path and being able to travel along said path;
   an input shaft extending through the ends coverings and the chamber, the input shaft being operatively connected to the rotational shaft of the door assembly so as to rotate with the same;
   a first piston disk positioned inside the chamber and mounted about the input shaft, the first piston disk being slidably movable along the input shaft;
   a second piston disk positioned inside the chamber and mounted about the input shaft, the second piston disk being slidably movable along the input shaft and being further connected to the first piston disk with spacer rods so as to slide in accordance with the first piston disk along the input shaft; and
   a reciprocating assembly operatively connected between the input shaft and the piston disks and cooperating with the same for converting a rotation of the input shaft into a reciprocating movement of the pistons disks within the chamber, so that said reciprocating movement of the pistons disks inside the chamber causes in turn the fluid to travel along a reciprocating movement along the hydraulic flow path, said reciprocating movement of the fluid along the hydraulic flow path causing a damping effect of the rotation of the input shaft and thus controlling the rotation of the rotational shaft of the door assembly via a damping effect.

2. A hydraulic governor device according to claim 1, wherein the reciprocating assembly comprises a plurality of cams securely mounted about the input shaft, between the first and second piston disks, a first element protruding from the first piston disk, and a second element protruding from the second piston disk, the first element cooperating with the cams via a rotation of the input shaft for urging the first piston disk away from the cams and the second element cooperating with the cams via a rotation of the input shaft for urging the second piston disk away from the cams, thereby causing the first and second piston disks to undergo a reciprocating movement inside the chamber as the rotational shaft of the door assembly rotates.

3. A hydraulic governor device according to claim 1, wherein at least one of the end coverings is provided with a flow control valve operatively connected to the hydraulic flow path for controlling flow rate conditions of the fluid inside the hydraulic flow path, and thus controlling rate of rotation of the rotational shaft of the door assembly.

4. A hydraulic governor device according to claim 1, wherein the fluid is a substantially incompressible fluid.

5. A hydraulic governor device according to claim 1, wherein the device comprises a first guiding post operatively connected between the first end covering and the first piston disk for guiding movement of the first piston disk along the chamber.

6. A hydraulic governor device according to claim 5, wherein the device comprises a second guiding post operatively connected between the second end covering and the second piston disk for guiding movement of the second piston disk along the chamber.

7. A hydraulic governor device according to claim 1, wherein the piston disks comprise bores through which extend the input shaft, said bores being provided with bearings for facilitating sliding of the piston rods along the input shaft.

8. A hydraulic governor device according to claim 1, wherein the device comprises seals provided between the piston disks and the chamber, and between the piston disks and the input shaft, for substantially preventing fluid from the hydraulic flow path from entering into the chamber between the first and second piston disks.

9. A hydraulic governor device according to claim 1, wherein the first and second end coverings are mounted respectively onto the first and second ends of the sleeve and fastened onto each other by means of tie rods.

10. A hydraulic governor device according to claim 1, wherein the device comprises a first seal provided between the first end of the sleeve and the first end covering, and a second seal provided between the second end of the sleeve and the second end covering, for substantially preventing fluid from exiting the device.

11. A door assembly having a door curtain operable via a rotation of a rotational shaft, the door assembly comprising a hydraulic governor device cooperating with the rotational shaft for controlling a rotation of said shaft, the device comprising:
   a sleeve having first and second opposite ends, the sleeve comprising a chamber, and a tube being separate from said chamber;
   first and second end coverings each being provided with a recess shaped and sized to cooperate with the tube and the chamber, the first and second end coverings being mounted respectively onto the first and second ends of the sleeve so as to define a hydraulic flow path from one end of the chamber to another end of the chamber, said hydraulic flow path extending through the recess of the first end covering, the tube, and the recess of the second end covering;
   a fluid substantially filling the hydraulic flow path and being able to travel along said path;
   an input shaft extending through the ends coverings and the chamber, the input shaft being operatively connected to the rotational shaft of the door assembly so as to rotate with the same;
   a first piston disk positioned inside the chamber and mounted about the input shaft, the first piston disk being slidably movable along the input shaft;
   a second piston disk positioned inside the chamber and mounted about the input shaft, the second piston disk being slidably movable along the input shaft and being further connected to the first piston disk with spacer rods so as to slide in accordance with the first piston disk along the input shaft; and
   a reciprocating assembly operatively connected between the input shaft and the piston disks and cooperating with the same for converting a rotation of the input shaft into a reciprocating movement of the pistons disks within the chamber, so that said reciprocating movement of the pistons disks inside the chamber causes in turn the fluid to travel along a reciprocating movement along the hydraulic flow path, said reciprocating movement of the fluid along the hydraulic flow path causing a damping effect of the rotation of the input shaft and thus controlling the rotation of the rotational shaft of the door assembly via a damping effect.

12. A door assembly according to claim 11, wherein the reciprocating assembly comprises a plurality of cams securely mounted about the input shaft, between the first and second piston disks, a first element protruding from the first piston disk, and a second element protruding from the second piston disk, the first element cooperating with the cams via a rotation of the input shaft for urging the first piston disk away from the cams and the second element cooperating with the cams via a rotation of the input shaft for urging the second piston disk away from the cams, thereby causing the first and second piston disks to undergo a reciprocating movement inside the chamber as the rotational shaft of the door assembly rotates.

13. A door assembly according to claim 11, wherein at least one of the end coverings is provided with a flow control valve operatively connected to the hydraulic flow path for controlling flow rate conditions of the fluid inside the hydraulic flow path, and thus controlling rate of rotation of the rotational shaft of the door assembly.

14. A door assembly according to claim 11, wherein the fluid is a substantially incompressible fluid.

15. A door assembly according to claim 11, wherein the device comprises a first guiding post operatively connected between the first end covering and the first piston disk for guiding movement of the first piston disk along the chamber.

16. A door assembly according to claim 15, wherein the device comprises a second guiding post operatively connected between the second end covering and the second piston disk for guiding movement of the second piston disk along the chamber.

17. A door assembly according to claim 11, wherein the piston disks comprise bores through which extend the input shaft, said bores being provided with bearings for facilitating sliding of the piston rods along the input shaft.

18. A door assembly according to claim 11, wherein the device comprises seals provided between the piston disks and the chamber, and between the piston disks and the input shaft, for substantially preventing fluid from the hydraulic flow path from entering into the chamber between the first and second piston disks.

19. A door assembly according to claim 11, wherein the first and second end coverings are mounted respectively onto the first and second ends of the sleeve and fastened onto each other by means of tie rods.

20. A door assembly according to claim 11, wherein the device comprises a first seal provided between the first end of the sleeve and the first end covering, and a second seal provided between the second end of the sleeve and the second end covering, for substantially preventing fluid from exiting the device.

* * * * *